No. 746,255. PATENTED DEC. 8, 1903.
R. BAGGALEY.
APPARATUS FOR THE TREATMENT OF FURNACE GASES.
APPLICATION FILED JUNE 27, 1903.
NO MODEL.
7 SHEETS—SHEET 1.

No. 746,255. PATENTED DEC. 8, 1903.
R. BAGGALEY.
APPARATUS FOR THE TREATMENT OF FURNACE GASES.
APPLICATION FILED JUNE 27, 1903.
NO MODEL. 7 SHEETS—SHEET 3.

WITNESSES
INVENTOR
Ralph Baggaley

No. 746,255. PATENTED DEC. 8, 1903.
R. BAGGALEY.
APPARATUS FOR THE TREATMENT OF FURNACE GASES.
APPLICATION FILED JUNE 27, 1903.
NO MODEL. 7 SHEETS—SHEET 4.
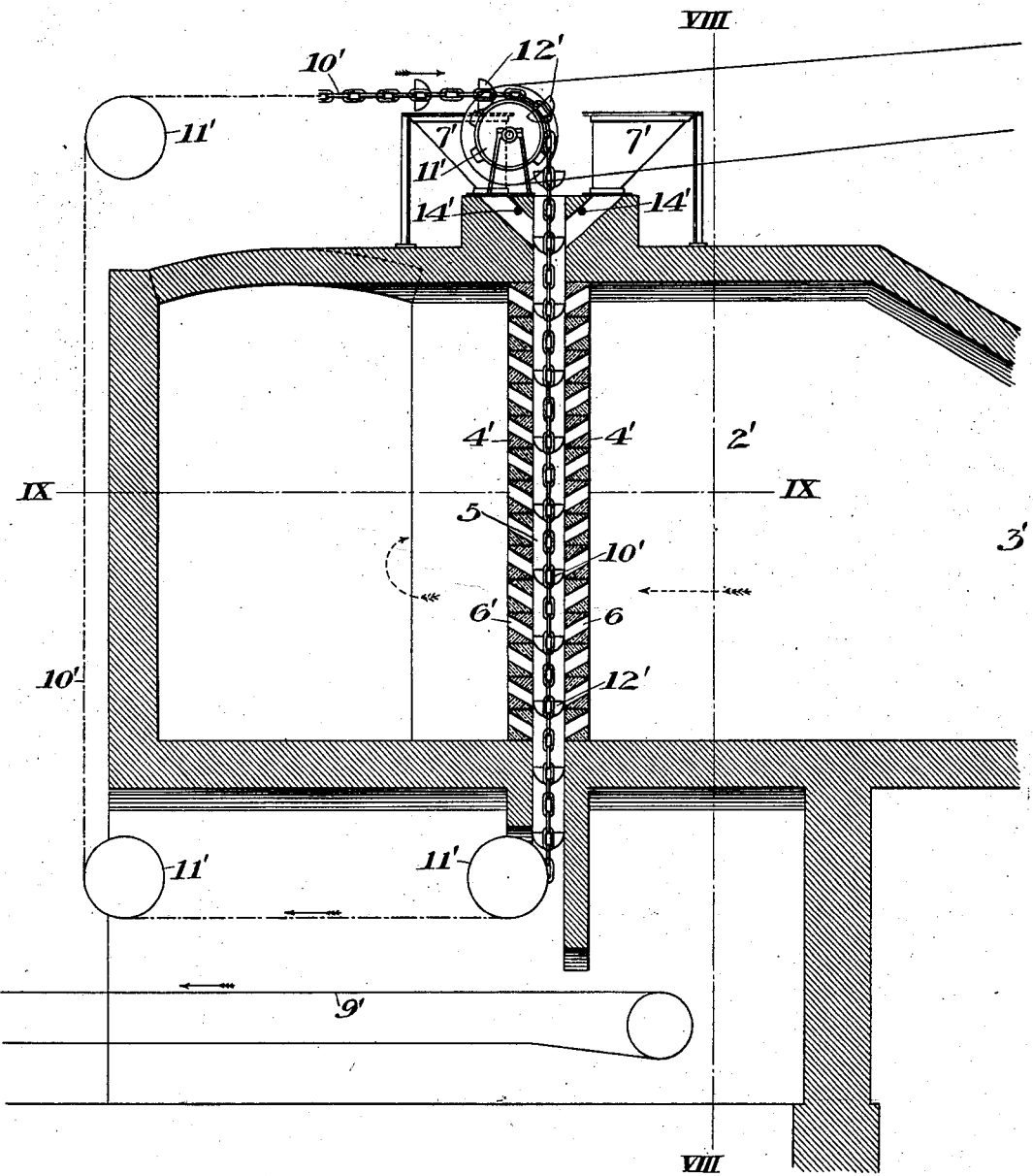

No. 746,255. PATENTED DEC. 8, 1903.
R. BAGGALEY.
APPARATUS FOR THE TREATMENT OF FURNACE GASES.
APPLICATION FILED JUNE 27, 1903.
NO MODEL. 7 SHEETS—SHEET 5.
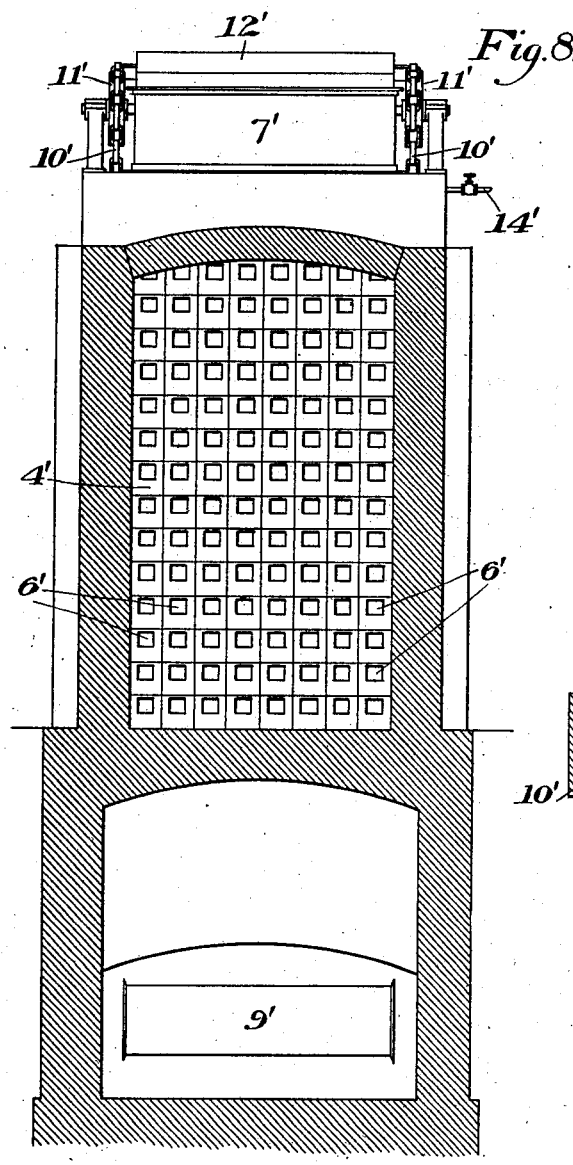
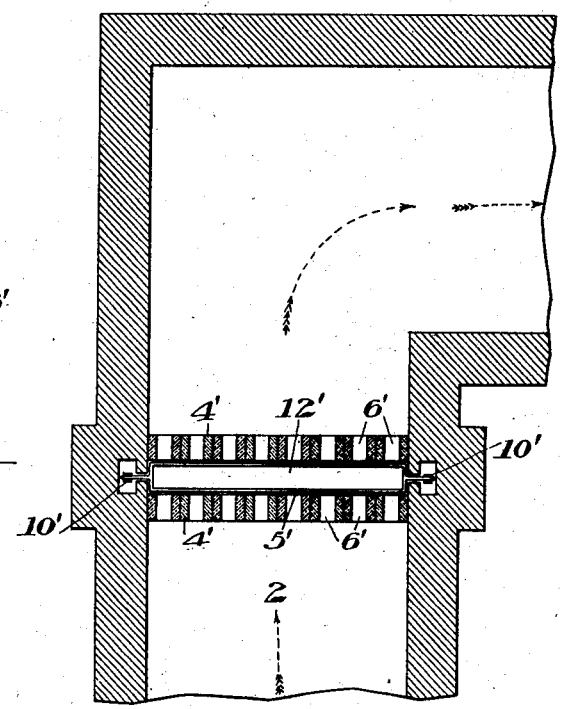
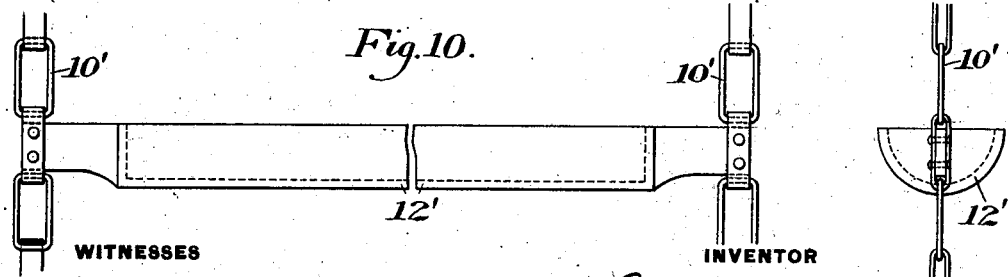
WITNESSES
INVENTOR No. 746,255. PATENTED DEC. 8, 1903.
R. BAGGALEY.
APPARATUS FOR THE TREATMENT OF FURNACE GASES.
APPLICATION FILED JUNE 27, 1903.
NO MODEL. 7 SHEETS—SHEET 6.

WITNESSES

INVENTOR

No. 746,255. PATENTED DEC. 8, 1903.
R. BAGGALEY.
APPARATUS FOR THE TREATMENT OF FURNACE GASES.
APPLICATION FILED JUNE 27, 1903.
NO MODEL. 7 SHEETS—SHEET 7.

WITNESSES
INVENTOR

No. 746,255. Patented December 8, 1903.

UNITED STATES PATENT OFFICE.

RALPH BAGGALEY, OF PITTSBURG, PENNSYLVANIA.

APPARATUS FOR THE TREATMENT OF FURNACE-GASES.

SPECIFICATION forming part of Letters Patent No. 746,255, dated December 8, 1903.

Application filed June 27, 1903. Serial No. 163,322. (No model.)

*To all whom it may concern:*

Be it known that I, RALPH BAGGALEY, of Pittsburg, Allegheny county, Pennsylvania, have invented a new and useful Apparatus for the Treatment of Furnace-Gases, of which the following is a full, clear, and exact description, reference being had to the accompanying drawings, forming part of this specification, in which—

Figure 1:
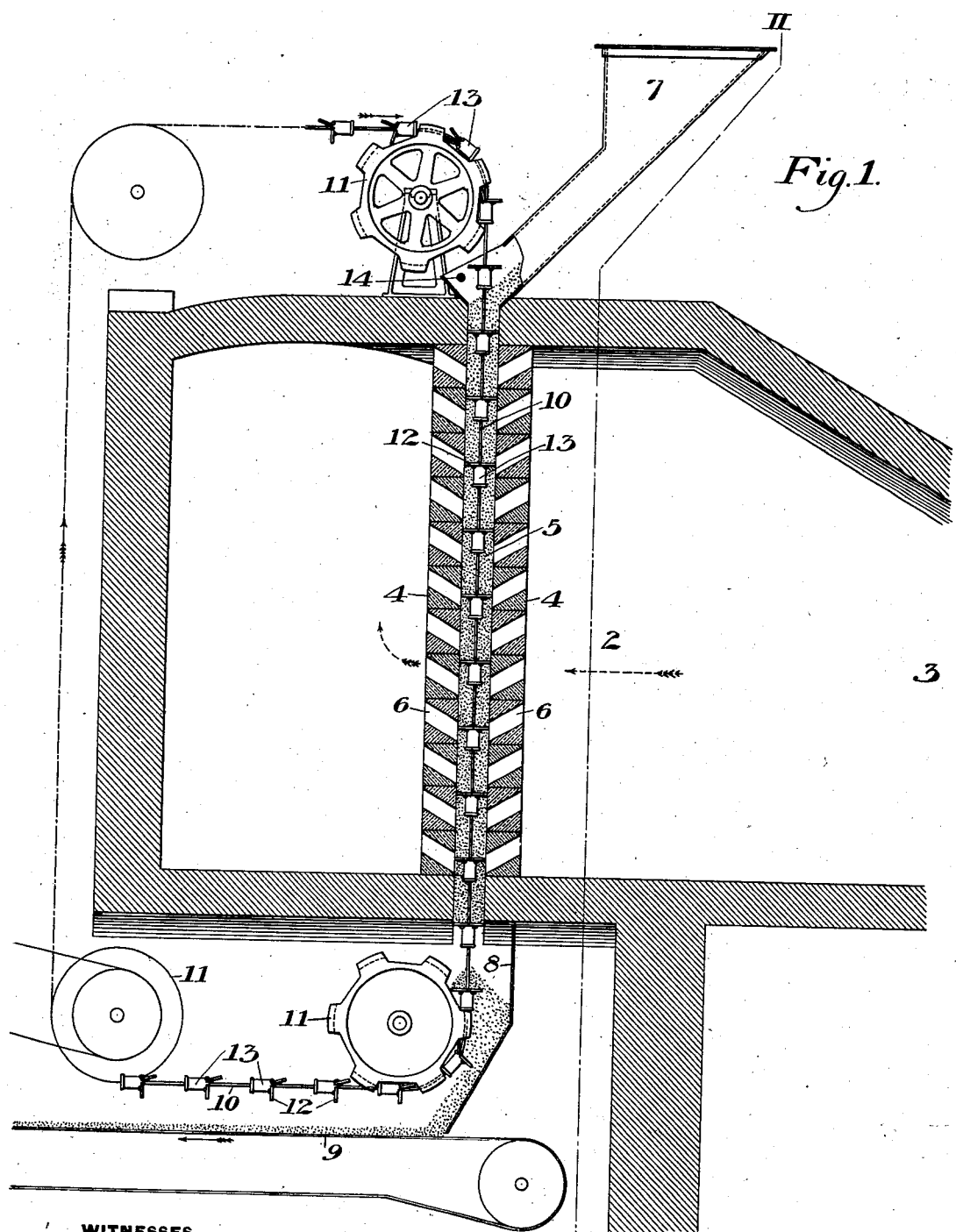
Figure 2:
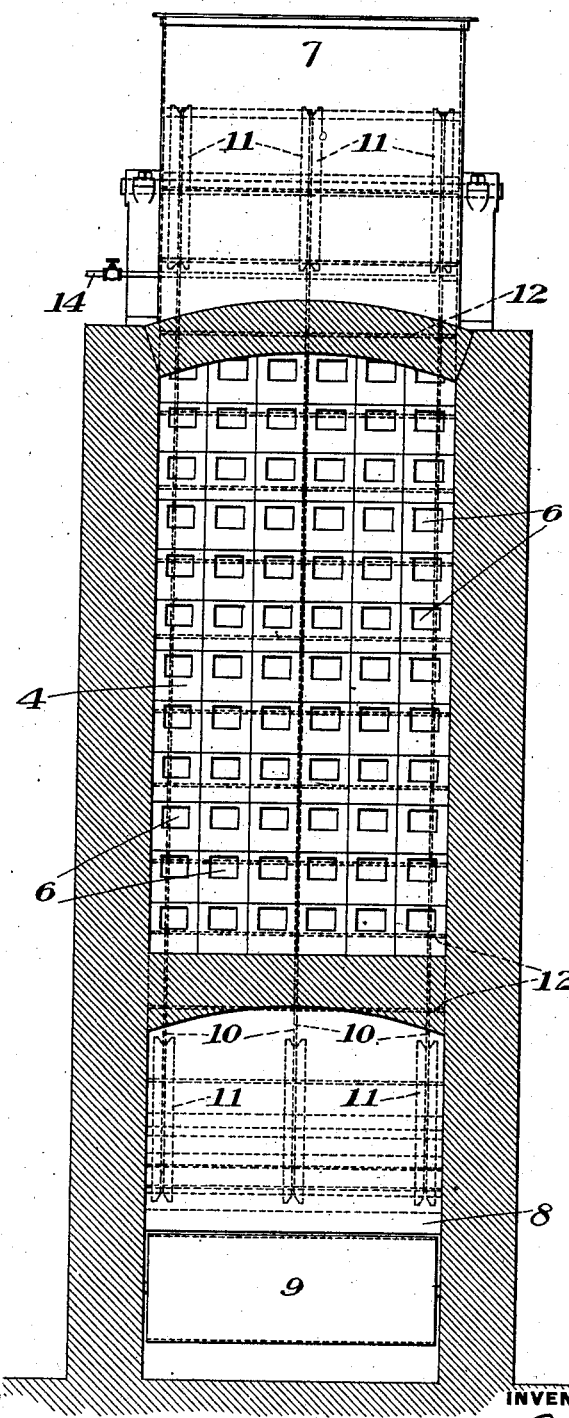
Figure 4:
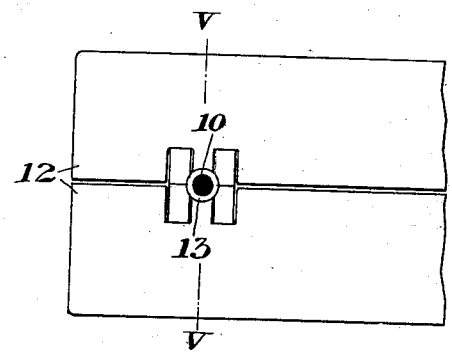
Figure 5:
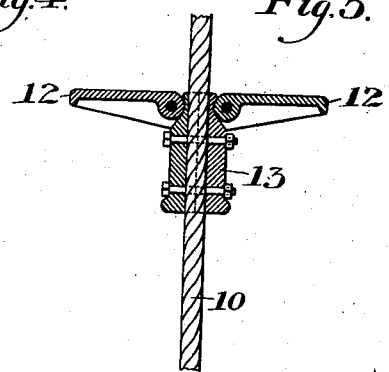
Figure 3:
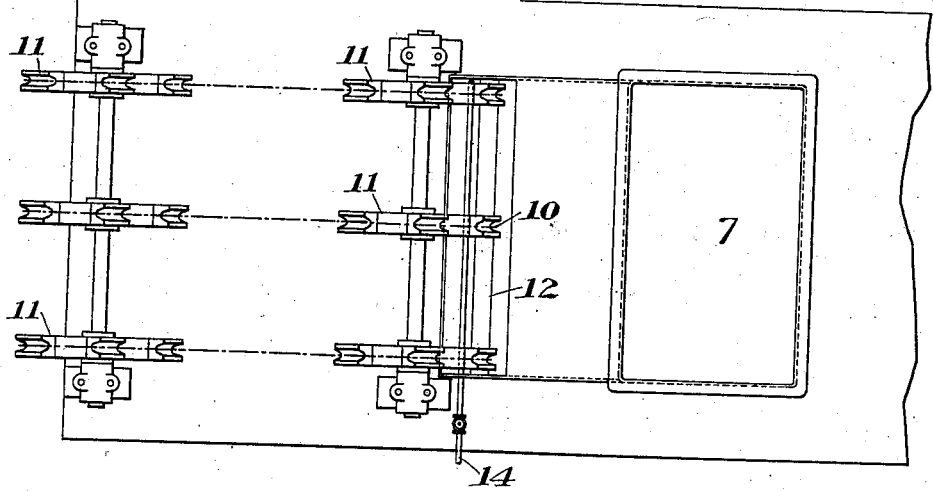
Figure 6:
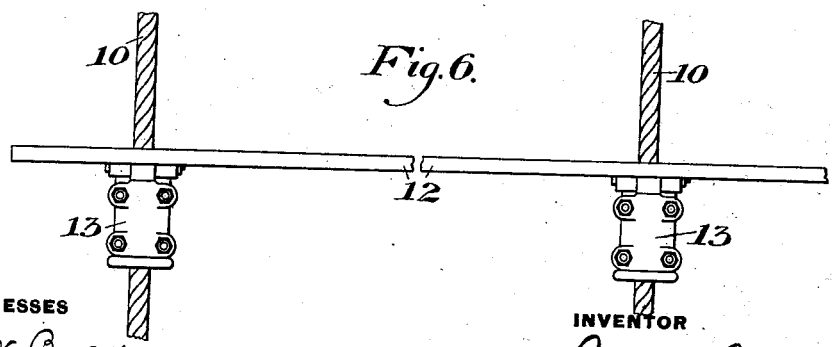
Figure 12:
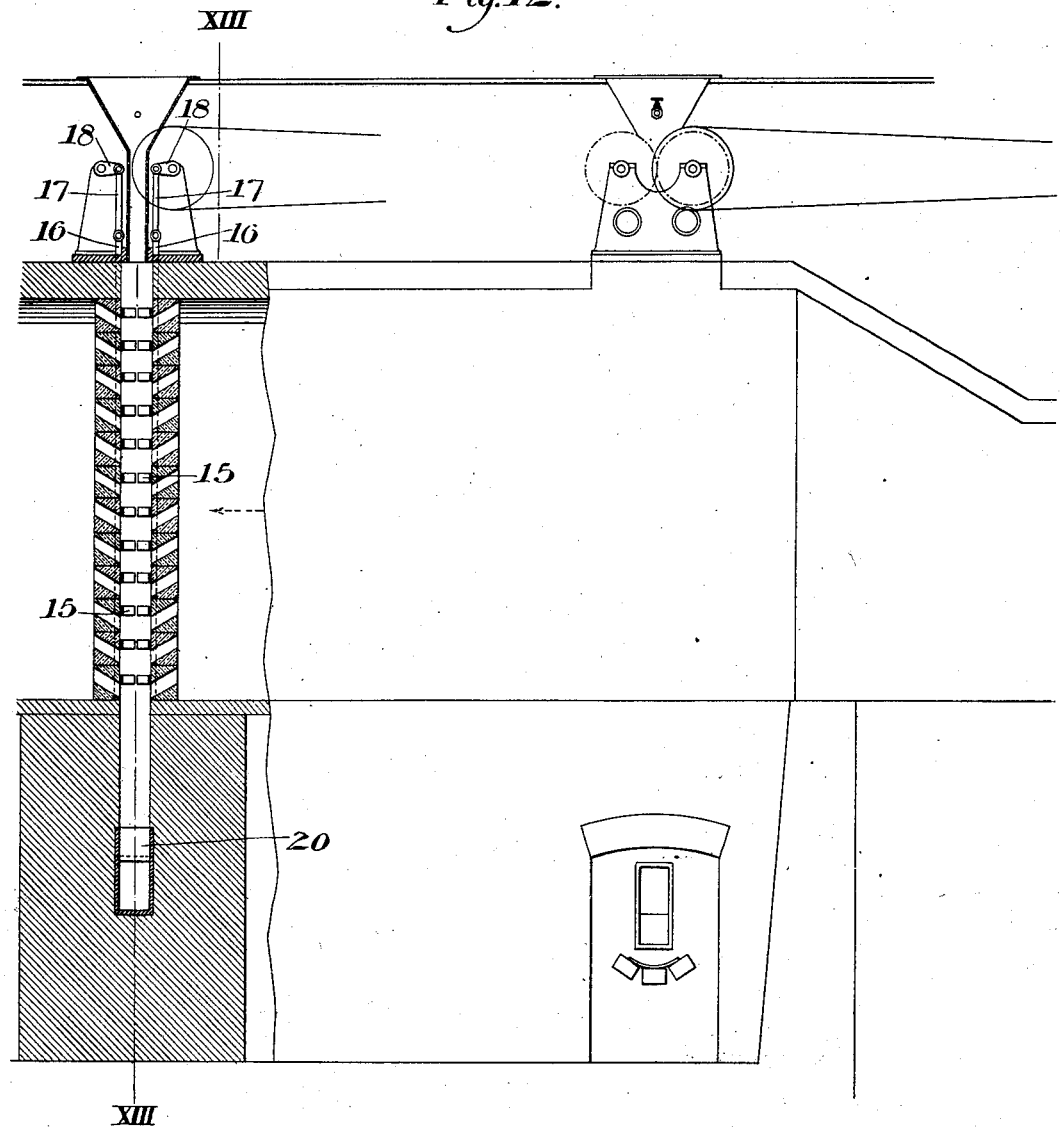
Figure 13:
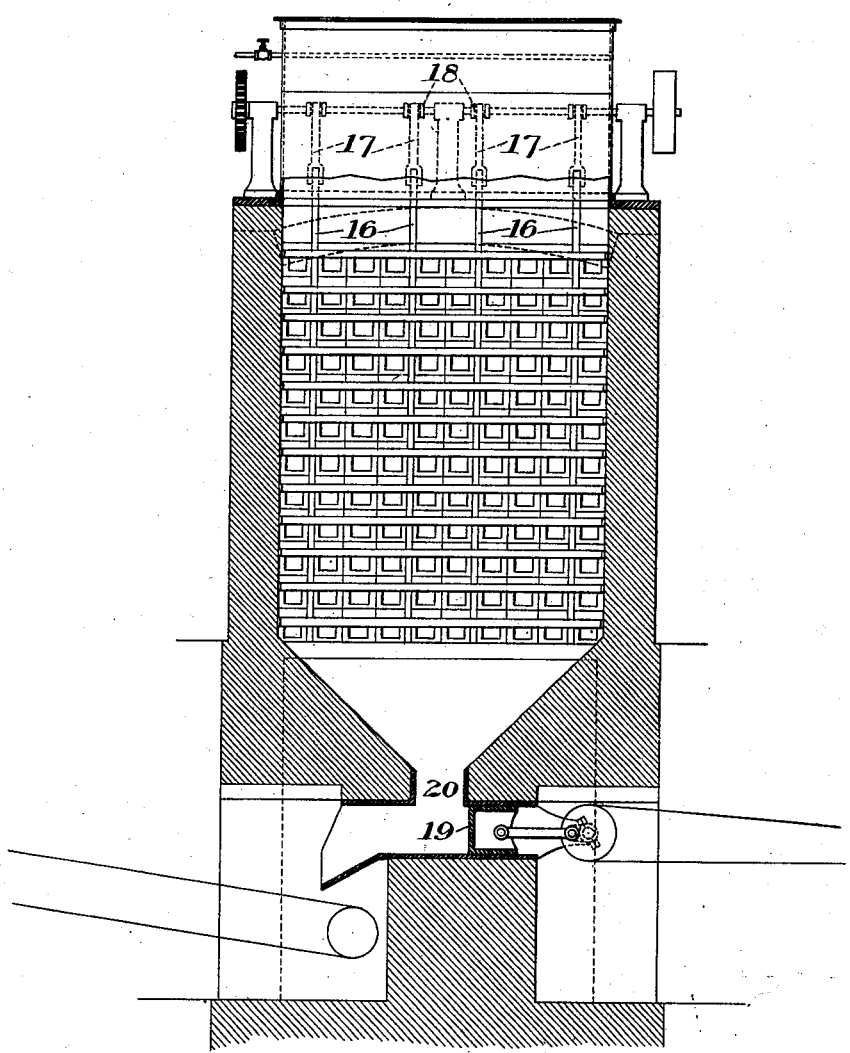
Figure 14:
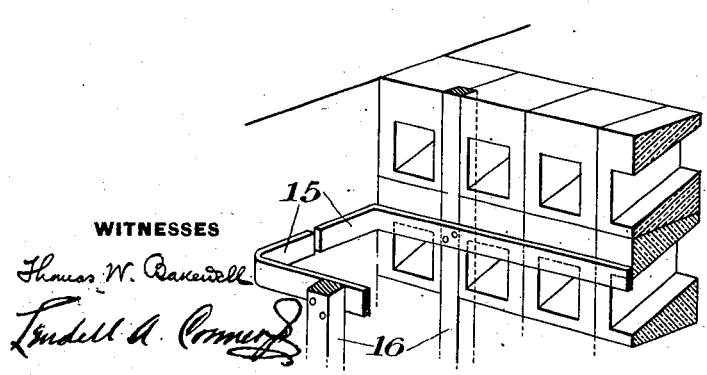

Figure 1 is a vertical longitudinal section of apparatus embodying my invention. Fig. 2 is a vertical central section on the line II II of Fig. 1. Fig. 3 is a top plan view of the apparatus shown in Fig. 1. Fig. 4 is a plan view of the device for moving the filtering material within the screen-chamber. Fig. 5 is a vertical section on the line V V of Fig. 4. Fig. 6 is an elevation showing one of the leaves of the moving mechanism. The figures on Sheets 4 and 5 illustrate a modification. Fig. 7 is a vertical longitudinal section of apparatus with a modified construction of moving mechanism. Fig. 8 is a vertical section on the line VIII VIII of Fig. 7. Fig. 9 is a horizontal section on the line IX IX of Fig. 7. Figs. 10 and 11 are details. Fig. 12 on Sheet 6 illustrates a third modification and is a side elevation of the apparatus, partly in vertical section. Fig. 13 is a vertical section on the line XIII XIII of Fig. 12, and Fig. 14 is a perspective detail view.

My invention consists in a novel apparatus for preventing the devastating effects to vegetation and to the streams arising from the smelting of ores containing sulfur, arsenic, &c. It is well known that the country surrounding smelting plants sometimes for many miles distance is devastated through the destruction of vegetation by the fumes inseparable from the fusion of sulfid ores.

In a furnace smelting three hundred and sixty tons of ore that contains, say, twenty per cent. of sulfur from sixty to seventy-five tons of sulfur are volatilized and of course deposited in the surrounding country. On damp or rainy days the sulfur will fall within a short distance of the smelter-stack. On clear days it will often be carried for a distance of fifteen or twenty miles. The result is the same wherever it falls. Vegetation is destroyed and the sulfur is carried by the surface drainage into the streams and ponds, and the water is polluted and rendered unfit for use. So serious has this become that it is impossible to operate smelting plants and to conduct agriculture successfully in the same district.

My invention is founded on the fact that the sulfur and sulfur dioxid gases can be removed from smelter-gases by passing them through a screen or filter of broken material, preferably broken furnace-slag moistened with water or alkaline solution, if means are provided for renewing the surface of the broken material which is exposed to the gases and keeping it in such condition as to be readily permeable thereby. Instead of broken slag I may use fragments of rock, gravel, or other suitable waste non-inflammable material. I am aware that it has been proposed to employ broken material as a screen for the mechanical separation of impurities from gases; but the lack of means for moving or renewing the material has prevented such devices from being efficient. My invention overcomes such defects and provides an apparatus which is simple and effective in its operation. The importance of the results accomplished renders the invention of great practical value.

In practical use of my invention it will not be necessary ordinarily to eliminate all the sulfur. If twenty per cent. of the sulfur fumes, for example, is allowed to escape, the fumes will be so dilute as to readily become dissipated in the atmosphere without serious injury to the surrounding country.

In my apparatus I provide a chamber containing successive screens each charged with broken filtering material, and as the material becomes spent or coated with the impurities I discharge it below upon conveying mechanism.

Referring now to Fig. 1, 2 is a chamber connected by a flue 3 with the discharge-opening of a copper-smelting furnace and also leading to a stack-flue or exhaust-fan, by which a draft is created sufficient to cause the gases to pass through the chamber and through the screen or screens therein. Each screen, as shown in Fig. 1, is constituted by vertical walls 4 4, of tile or masonry, extending across the chamber and having an intermediate screen-chamber 5 for containing the filtering material. These walls have perforations 6 6, which are preferably inclined upwardly from the interior space, so as to permit free passage of the gases and to prevent loss of the material. At the top of the chamber 5 is a hopper 7, through which the broken slag is fed to the chamber, and at the bottom is a discharge-chute 8, leading to a conveyer 9, by which the discharged slag is carried to the dump. For the purpose of moving the material within the chamber 5 for renewing it and for preventing it from settling in such close mass as to prevent free passage of the gases I employ moving mechanism of which the preferable construction is shown in Fig. 1. It consists of endless ropes or chains 10, passing around sprocket-wheels 11 11 and through the screen-chamber 5. Leaves or shelves 12 are pivotally connected to clamps 13 on the ropes and preferably extend along the full width of the screen-chamber. Being pivoted they will pass freely around the sprocket-wheels; but when passing through the screen-chamber they lie horizontally, so as to afford moving supports for the filtering material. These supports separate the filtering material into strata, and thus keep it from packing in the screen-chamber and obstructing the flow of gases.

The broken slag is fed to the screen-chamber from the hopper 7, and as the moving shelves 12 pass the hopper they carry portions of it downwardly. The slag is wetted by water or alkaline solution from a pipe or pipes 14. It will thus be seen that by the motion of the shelves the broken slag is caused to travel through the screen-chamber and to present fresh surfaces and that it is separated into layers, so as to be readily permeable by the gases. As the slag reaches the bottom of the screen-chamber it drops upon a conveyer 9 and is carried to the dump or to a car, by which it is removed. The endless ropes 11, carrying the shelves, may be moved either continuously or intermittently, as desired, and the rate of their travel determines the speed at which the broken slag is moved.

The apparatus is entirely mechanical and can be operated with a minimum labor and with little cost.

As the shelves move through the screen-chamber their edges act as cutters and dislodge from the walls of the chamber the incrustations deposited thereon from the gases, permitting them to descend with the filtering material. The same function is performed by the edges of the buckets in the modification shown in Figs. 7, 8, and 9, in which the construction is or may be the same as that above described, except that the moving mechanism for the slag consists of buckets 12', secured to endless chains 10'. I also show in these figures a double hopper 7' at the upper end of the screen-space.

In the modification shown in Figs. 12 and 13 I employ as the moving mechanism bars 15, which extend horizontally across the screen-chamber and are connected by vertical rods 16, set in grooves in the masonry walls and adapted to be reciprocated by links 17 from cranks 18. The bars 15 are preferably made of hard wood, faced with brass or other material not corrodible by the furnace-gases, or they may be made entirely of brass. The bars on opposite sides of the screen-chamber are moved by the cranks in opposite directions, and thus serve as cutters and constantly free the interior of the chamber from incrustations.

The rate of discharge of the filtering material from the screen-chamber is governed by a discharge mechanism comprising, preferably, a reciprocating valve or plunger 19, controlling an opening 20 at the base of the chamber. At each reciprocation of this plunger it permits the discharge of a certain quantity of the material from the screen-chamber and ejects it upon the conveyer, so that by regulating the speed of the plunger the rate of discharge of the material may be determined. All liability of the material to scaffold in the screen-chamber is prevented by reciprocation of the bars.

The removal of the incrustations from the walls is a matter of great practical importance.

In an ordinary smelting-furnace having a capacity of three hundred and sixty tons of ore in twenty-four hours, which ore may contain twenty per centum of sulfur, it will be necessary to precipitate from the fumes in each twenty-four hours at least from fifty to seventy-five tons of such impurities, according to the character of the ore under treatment. Over one-fifth ($\frac{1}{5}$) of these three hundred and sixty tons every day will be expelled in the form of sublimated metals or metalloids. It is possible that such a furnace will sometimes throw off in gases a total of one hundred tons in twenty-four hours, or approximately four tons per hour, or one ton in every fifteen minutes, or, say, one hundred pounds per minute. A portion of the deposited impurities will precipitate as a hard mass in the flues on the interior of the flue-walls and especially around the interior edges of each flue, and as the tonnage precipitated is very great such accumulations of incrustations, &c., are necessarily quite rapid, and in time such projections of precipitated material on the interior of the flue-walls will interfere with and obstruct the draft and in time may clog and obstruct the travel of the screens. It is important that these obstructions be quickly and cheaply removed from the interior walls so often as may be desired and in such a manner that the apparatus will not be thrown out of service or its successful working be delayed or interfered with. It is also of importance that this work should be accomplished without manual labor.

In the apparatus shown in the drawings the removal of the precipitated impurities is accomplished efficiently. In the construction shown in Figs. 12 and 13 of the drawings the upright rods or bars that carry the cutter-bars are countersunk into the flue-walls between each upright row of flues, in which manner they are protected from the action of the gases and are also partially protected from the action of the alkaline solutions on the filtering material. Each cutter-bar when at rest is shielded and protected from the action of the gases. Each upright bar is provided with guides both above and below that hold it rigidly into the exact position necessary to enable the cutter-bars to do the most effective work in their mission of removing such incrustations and precipitated materials. The cutter-bars themselves may be adjusted to any angle to make their work most effective, and the entire mechanism may be arranged, if desired, so as to work continuously and slowly or intermittently and rapidly, whichever may be found in practice to best suit the work and to produce the most economical results in each plant where my invention may be utilized.

Within the scope of my invention as defined in the claims the apparatus may be modified in various particulars, since

What I claim is—

1. Apparatus for removing impurities from gases, comprising a screen-chamber containing a charge of broken material, and mechanism moving in the chamber and adapted to cause its passage therethrough; substantially as described.

2. Apparatus for removing impurities from gases, comprising a screen-chamber and screen, and mechanism moving in the chamber and adapted to cause passage of the screen, and means for wetting the screen material; substantially as described.

3. Apparatus for removing impurities from gases, comprising a screen-chamber and filtering material and a series of supports moving through the chamber and adapted to move the filtering material and separate it into strata; substantially as described.

4. Apparatus for removing impurities from gases, comprising a screen-chamber and filtering material and a series of supports moving through the chamber and adapted to move the filtering material and separate it into strata, said supports being pivoted; substantially as described.

5. Apparatus for removing impurities from gases, comprising a screen-chamber and filtering material, a series of supports moving through the chamber and adapted to move the filtering material and separate it into strata, and a hopper from which the material is fed; substantially as described.

6. Apparatus for removing impurities from gases, comprising a screen-chamber and filtering material, and a series of supports mounted on an endless chain or rope, moving through the chamber and adapted to move the filtering material and separate it into strata; substantially as described.

7. Apparatus for removing impurities from gases, comprising a screen-chamber and a screen of filtering material, mechanism moving in the chamber and having cutters for removing incrustations; substantially as described.

8. Apparatus for removing impurities from gases, comprising in combination with a chamber through which the gases pass, mechanism having cutters adapted to remove incrustations from the walls; substantially as described.

In testimony whereof I have hereunto set my hand.

RALPH BAGGALEY.

Witnesses:
GEO. B. BLEMING,
JOHN MILLER.